United States Patent [19]

Murray

[11] Patent Number: 4,747,039
[45] Date of Patent: May 24, 1988

[54] APPARATUS AND METHOD FOR UTILIZING AN AUXILIARY DATA MEMORY UNIT IN A DATA PROCESSING SYSTEM HAVING SEPARATE PROGRAM AND DATA MEMORY UNITS

[75] Inventor: Kenneth W. Murray, West Lothian, Scotland

[73] Assignee: Burr-Brown Corporation, Tucson, Ariz.

[21] Appl. No.: 764,215

[22] Filed: Aug. 9, 1985

[30] Foreign Application Priority Data

Mar. 23, 1985 [GB] United Kingdom ............... 8507617

[51] Int. Cl.⁴ .............................................. G06F 12/00
[52] U.S. Cl. ............................................... 364/200
[58] Field of Search ... 364/200 MS File, 900 MS File

[56] References Cited

U.S. PATENT DOCUMENTS 4,028,683  6/1977  Divine et al. .................... 364/900

Primary Examiner—Raulfe B. Zache
Attorney, Agent, or Firm—Harry M. Weiss & Associates

[57] ABSTRACT

In a data processing system in which the program memory unit and the internal data memory unit are separately addressed, and which special instructions for transferring data between these two units are available, apparatus and method are described for increasing the memory available for the internal data memory unit. The increased storage space takes the form of an auxiliary data memory unit that is activated when the special instruction for the transfer of data signal groups between the program memory unit and the data memory unit are evoked. Apparatus is provided for identifying the presence of the special instructions, and this identification generates the signals for inactivating the program memory unit and for activating the auxiliary data unit for the purposes of transfer of data signal groups between the internal data unit and the auxiliary data memory unit.

17 Claims, 3 Drawing Sheets

4,747,039

APPARATUS AND METHOD FOR UTILIZING AN AUXILIARY DATA MEMORY UNIT IN A DATA PROCESSING SYSTEM HAVING SEPARATE PROGRAM AND DATA MEMORY UNITS

BACKGROUND OF THE INVENTION

1. Field of the Invention

This invention relates generally to data processing systems and, more particularly, to a method and apparatus for expanding the available memory for storage data in data processing systems in which the data memory unit and the program memory unit are separated.

2. Discussion of the Related Art

It is known to provide data processing units with separate program memory units and data memory units. This architecture, referred to as the Harvard Architecture, provides certain performance enhancements in that the instruction fetch operation and instruction execution operation can be conveniently performed in a sequence of sub-operations or referred to as pipelining.

It is also known in the art to provide a modification of the Harvard Architecture that provides a path from the data memory of the data processing system to the program memory unit. Special instructions can be added to the instruction set of the data processing system to permit the data processing system to make use of this data path. An example of such a data processing system is the Texas Instruments TMS 32010 microprocessor. In this data processing system, the special instruction for reading data from the program memory unit and to the data memory unit has the mnemonic TBLR, while the special instruction for the writing of data from the data memory unit into the program memory unit has the mnemonic TBLW. The feature of transferring data from the data memory unit to the program memory unit has proven to be very useful but suffers from the disadvantage that data signal groups stored in the program memory unit, when added to the signal groups forming the system program, are constrained by the size of the program memory, adding yet further limitations to the program size and flexibility.

A need has therefore been felt for a data processing system that is implemented with the Harvard Architecture, that can make use of the flexibility of special instructions for transfer of data signal groups between the program memory unit and the internal data memory unit without providing limitations on the program size.

SUMMARY OF THE INVENTION

It is therefore an object of the present invention to provide an improved data processing system.

It is another object of the present invention to provide an improved data processing system having a modified Harvard Architecture.

It is still another object of the present invention to provide additional memory space for a data processing unit having a modified Harvard Architecture.

It is still a further object of the present invention to provide an auxiliary data memory that can be used to transfer data signal groups between the data memory of a data processing unit and the auxiliary memory unit.

These and other objects are accomplished, according to the present invention, by a data processing system in which the internal data memory unit and the program memory unit are typically utilized separately, while yet providing a data path, under control of special instructions, to transfer data between the two memory units. An auxiliary memory unit is added having the same address configuration as the program memory unit. Apparatus is described for activating the auxiliary data memory unit and inactivating the program memory unit when the special instructions are identified. In this manner, the additional data signal groups stored in the auxiliary data memory unit can be made available to the internal data memory unit of the data processing unit.

These and other features of the present invention will be understood upon reading of the following description along with the accompanying figures.

DESCRIPTION OF THE PREFERRED EMBODIMENT

Detailed Description of the Figures

Figure 1:
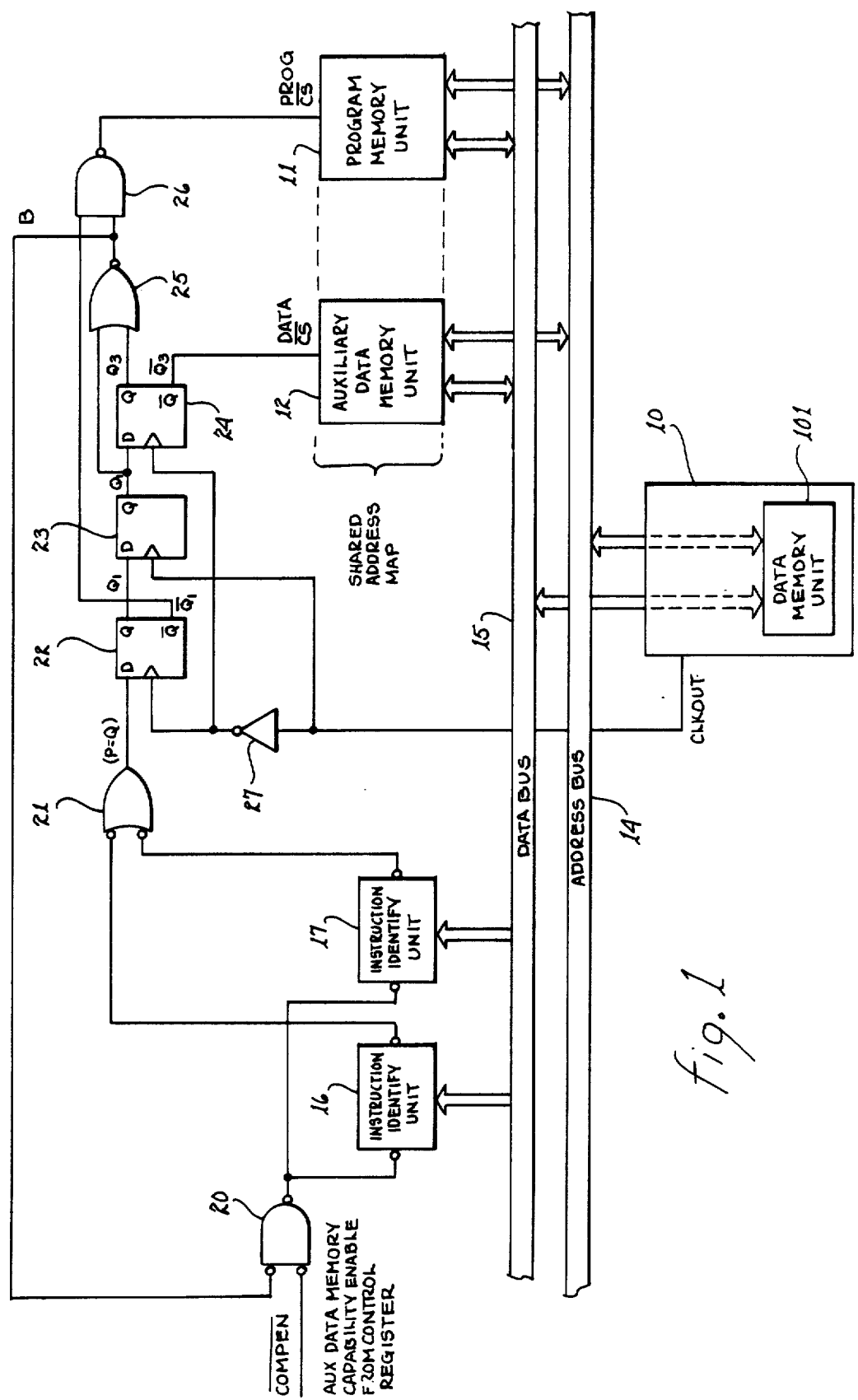
FIG. 1 is a schematic block diagram of the apparatus implementing the present invention.

Referring now to FIG. 1, a data processing unit 10, having an internal data memory unit 101 can be coupled to a data bus 15 and to a system address bus 14. Data processing unit 10 also applies a clock signal to an input terminal of inverting amplifier 27 and to a timing terminal of D-type multivibrator 23. The output terminal of inverting amplifier 27 is coupled to a timing clock terminal of D-type multivibrator 22 and to a clock terminal of D-type multivibrator 24. A logic AND gate 20 receives an inverted enable signal referred to as $\overline{\text{COMPEN}}$ in FIG. 1 at an inverted terminal of AND gate 20. The inverted output signal of AND gate 20 is applied to an inverted enable terminal of instruction identify unit 16 and to an inverted input terminal of instruction identify unit 17. The inverted output terminal of instruction identify unit 16 is coupled to an inverting terminal of logic OR gate 21 and an inverted output terminal of instruction identify unit 17 is applied to an inverted input terminal of logic OR gate 21. The instruction identify unit 16 and the instruction identify unit 17 are both coupled to the system data bus 15. The output terminal of the logic OR gate 21 is coupled to the D terminal of D-type multivibrator unit 22, while the output terminal Q of multivibrator 22 applies signal $Q_1$ to the D terminal of D-type multivibrator 23. The inverted output terminal of D-type multivibrator 22 labeled $\overline{Q_1}$ is coupled to a first input terminal of logic AND gate 26. The output terminal Q of D-type multivibrator 23 is coupled to a D terminal of D-type multivibrator 24 and to a first input terminal of logic OR gate 25. An output terminal Q of multivibrator applies a signal $Q_3$ to a second input terminal of logic OR gate 25 while the inverting output terminal of D-type multivibrator 24, $\overline{Q_3}$ is applied to auxiliary data memory 12. The inverted output signal of logic OR gate 25 is applied to an inverting terminal of logic AND gate 20 and to a second input terminal of logic AND gate 26. An inverted output signal from logic AND gate 26 is applied to the program memory unit 11. The auxiliary data memory unit 12 and the program memory unit 11 are coupled both to the data bus 15 and to the system address bus 14.

Figure 2:
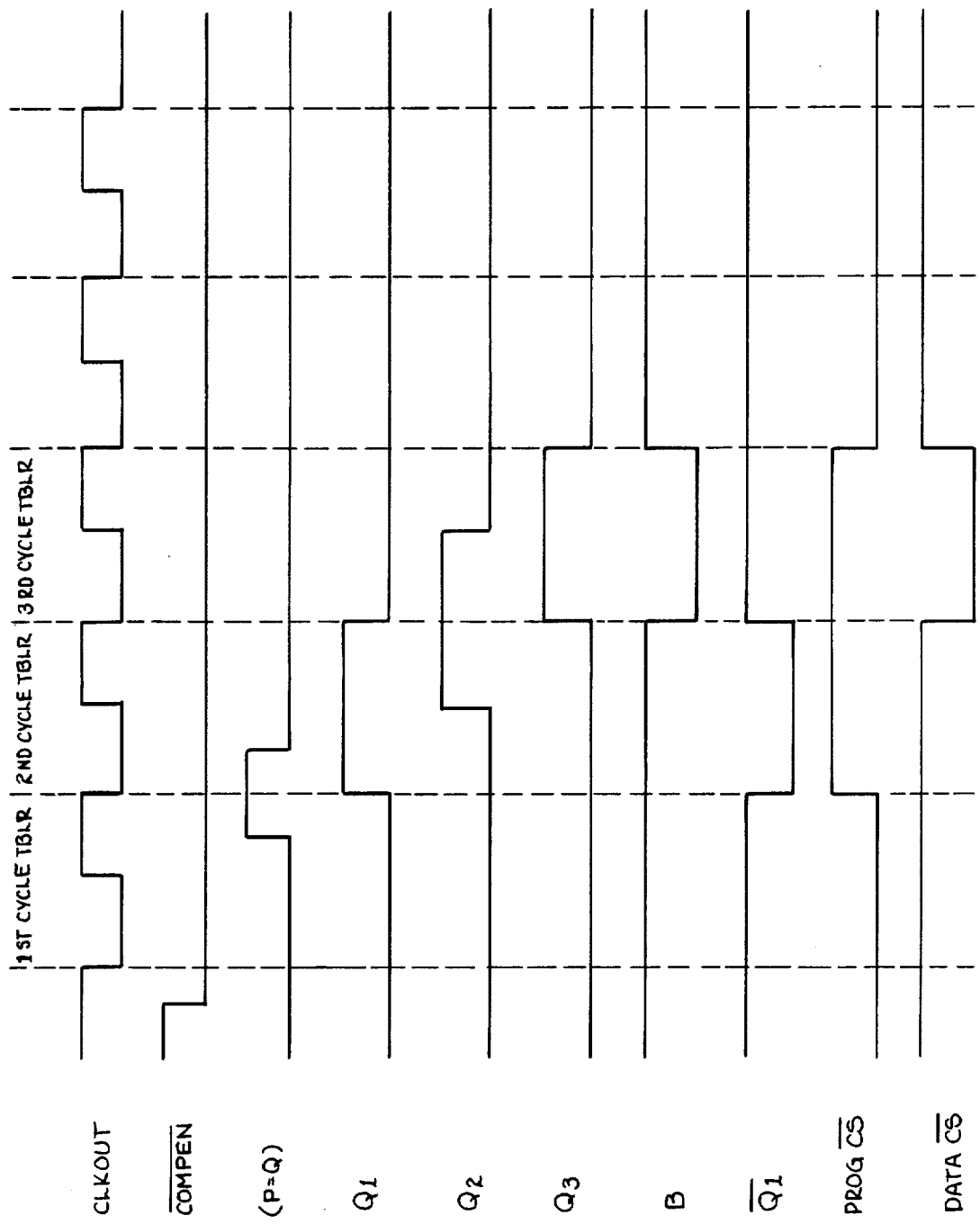
FIG. 2 is a timing diagram of the various signals of the apparatus of the instant invention.

Referring next to FIG. 2, a timing diagram for three cycles of a read operation are shown. The $\overline{\text{COMPEN}}$ signal goes to a negative logic level activating the identification units 16 and 17. In response to the identification of an appropriate instruction by units 16 and 17, the output signal of OR gate 21 will go to a positive. During the next timing cycle, signal $\overline{Q_1}$ will become a positive logic level and $Q_1$ will be a negative logic level. The program control signal will go high thereby disabling the program memory unit from responding to either the address signal group or the opcode signal group on the data bus. At the same time during the change of the clock cycle during the middle of the period, the output signal of D-type multivibrator 23, $Q_2$, will achieve a positive logic value during the intermediate clock transmission and remain in the positive value for an entire clock interval. The output signal of D-type multivibrator 24 will receive a positive logic signal during the third clock period and will have a negative logic value during the remainder of the operation. The output of the inverted OR gate 25 will achieve a negative logic level during the third clock period. The program memory is inactivated by the output signal of inverting AND gate 26 during the second and third cycles while the auxiliary data memory is activated 12 during the third clock cycle.

Figure 3:
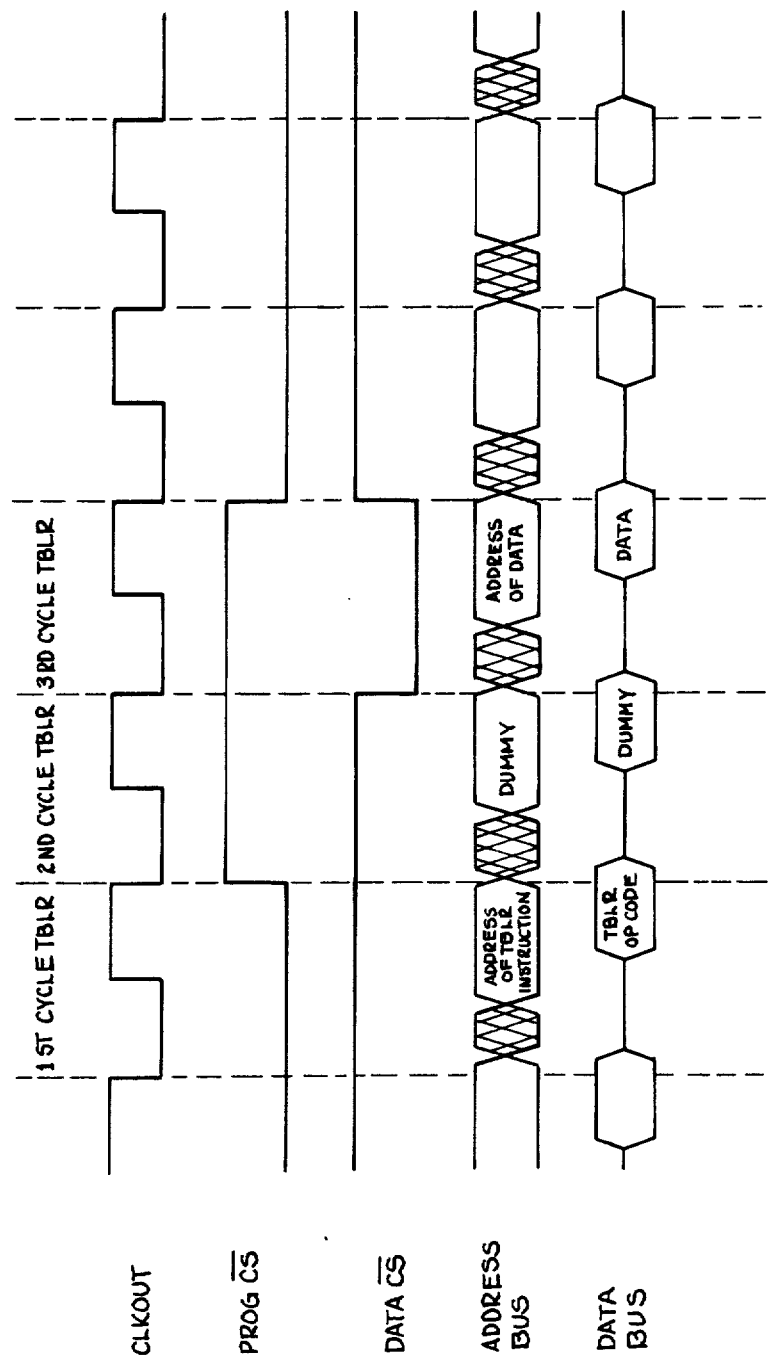
FIG. 3 is a timing diagram of the system signals indicating the transfer of data.

Referring to FIG. 3, the signal disabling the memory program unit 11 PROG $\overline{CS}$ and the signal activating the data memory, DATA $\overline{CS}$ are shown. For purposes of explanation, the signals on the address line as well as the signals on the data line for this operation are shown for the read operation.

Operation of the Preferred Embodiment

As discussed previously, in a data processing unit implemented in the Harvard Architecture, the data memory unit, and the program memory unit are separated. This separation can accommodate improvements in performance of the data processing system that are well known. Referring to FIG. 1, the program memory 11 and the internal data memory unit 101 of the data processing unit 10 are separate units, the internal data memory unit being coupled to the remainder of the data processing unit (ALU) 10 by separate address and data buses. Other electrical interconnections are also present, such as timing and control signal buses, however for purposes of understanding the present invention, discussion of these auxiliary signal transmitting components is not necessary for understanding of the invention. In order to expand the memory space available for the data signal groups, auxiliary data memory unit 12 is coupled to the address bus 14 and the data bus 15. To insure the use of the special read instruction and the special write instruction, the auxiliary data memory 12 must be activated and the normally accessible program memory unit 11 must be inactivated. To accomplish this, the data bus 15 is monitored by an instruction identify unit 16 and the instruction identify unit 17 for identifying either of the special instructions, i.e. the read instruction or the write instruction. A control line coupled to logic AND gate 20 enables the auxiliary memory unit by activating instruction identify unit 16 and 17 by a logic AND gate 20. This control line allows normal operation of the special read instruction and the special write instruction if required. When one of the special instructions is being fetched from the memory unit 11, the instruction identify unit 16 and 17 are activated applying a signal through the gate of the D-type multivibrator unit 22. The three D-type multivibrator units 22, 23 and 24 provide signals to inactivate the program memory unit 11 and to activate the auxiliary data memory unit 12 during the third clock cycle of the special instruction. Thus, data is transferred between the data memory of the data processing unit 10 and the auxiliary data memory unit 12, and does not include the program memory unit 11 as would be the normal mode of operation. Gate 20 is inactivated during the third clock cycle of the special instruction to prevent a possible conflict in accessing the auxiliary data memory unit 12 or the program memory unit 11. After the third clock cycle of the special instruction, the circuit is returned to its original state and the logic AND gate 20 can again be enabled for subsequent identification of special read and write instructions.

The above description is included to illustrate the operation of the preferred embodiment and is not meant to limit the scope of the invention. The scope of the invention is to be limited only by the following claims. From the above description many variations will be apparent to one skilled in the art that would yet be encompassed by the spirit and scope of the present invention.

What is claimed is:

1. A data processing system comprising:
    a data memory unit;
    a program memory unit connected to said data memory unit for transferring data between said program memory unit and said data memory unit in response to at least one special instruction;
    an auxiliary data memory unit; and
    selection means connected to said auxiliary data memory unit and to said program memory unit and responsive to said at least one special instruction for activating said auxiliary data memory unit and inactivating said program memory.

2. The data processing system of claim 1 further including means for enabling said selection means in response to an external signal.

3. The data processing system of claim 1 further including apparatus for disabling response of said system to a second at least one instruction when data is being transferred between said auxiliary data memory unit and said data memory unit.

4. In a data processing system having separate program and data memory units, the method of increasing storage space available for data signal groups comprising the steps of:
    providing special instructions permitting transfer of signal groups between said program memory unit and said data memory unit;
    coupling an auxiliary data memory unit with an address field corresponding to an address field of said program memory unit;
    identifying said special instructions; and
    activating said auxiliary data memory unit and inactivating said program memory unit upon identification of said special instructions.

5. The method of increasing storage space available for data signal groups of claim 4 wherein said identifying step further includes the step of utilizing apparatus coupled to a system bus for identification of signal groups implementing said special instructions.

6. The method of increasing storage space available for data signal groups of claim 5 further including the step of enabling said apparatus by a predetermined logic signal.

7. A data processing system comprising:
    a central processing unit;

first storage means connected to said central processing unit for storing signal groups having a first function in said data processing system;

second storage means connected to said central processing unit for storing signal groups having said first function and a second function in said data processing system;

first transfer means connected to said first storage means and said second storage means for transferring signal groups between said first storage means and said second storage means in response to first selected conditions;

third storage means connected to said central processing unit for storing signal groups having said first function; and second transfer means connected to said first storage means and said second storage means for transferring signal groups between said first storage means and said third storage means in response to second selected conditions.

8. The data processing system of claim 7 wherein said second transfer means includes means for identifying said first selected conditions.

9. The data processing system of claim 8 wherein said second transfer means includes means responsive to a logic signal for enabling said identifying means.

10. The data processing system of claim 9 wherein said first storage means is a data signal group memory and said second storage means is a program signal group memory.

11. The data processing system of claim 10 wherein said second transfer means includes means for inactivating said first transfer means.

12. The data processing system of claim 11 wherein said second transfer means disables said identifying means when data signal groups are being transferred between said first storage means and said third storage means.

13. In a data processing system including a data memory unit connected to a program memory unit and an auxiliary data memory unit, wherein data signal groups can be transferred between said data memory unit and said auxiliary data memory unit in response to at least one special instruction, apparatus for expanding said data memory unit and allowing the storage of said data signal groups, comprising:

said auxiliary data memory unit;

identification means for identifying said at least one special instruction; and coupling means coupled to said identification means for enabling said auxiliary data memory unit and disabling said program memory unit; and for transfer of said signal groups between said data memory unit and said auxiliary data memory unit.

14. The memory expansion apparatus of claim 13 wherein said disabling means is responsive to a control signal having a state indicative of a use of said program memory unit and a second state indicative of a use of said auxiliary data memory unit.

15. The memory expansion apparatus of claim 13 wherein said identification means is disabled during transfer of data signal groups between said auxiliary memory unit and said data memory unit.

16. The memory expansion apparatus of claim 15 wherein program memory unit addresses correspond to auxiliary memory unit addresses.

17. The memory expansion apparatus of claim 16 wherein said disabling means include D-type multivibrator, a first output terminal of said multivibrator coupled to said program memory unit, and wherein a second output terminal of said multivibrator is coupled to said auxiliary memory unit.

* * * * *

UNITED STATES PATENT AND TRADEMARK OFFICE
CERTIFICATE OF CORRECTION

PATENT NO. : 4,747,039

DATED : May 24, 1988

INVENTOR(S) : Kenneth W. Murray

It is certified that error appears in the above-identified patent and that said Letters Patent is hereby corrected as shown below:

On the title page
Please change the Assignee from "Burr-Brown Corporation, Tucson, Arizona" to --Burr-Brown Limited, Livingston, Scotland.--

Signed and Sealed this

Twenty-second Day of November, 1988

Attest:

DONALD J. QUIGG

*Attesting Officer*

*Commissioner of Patents and Trademarks*